(12) United States Patent
Liu et al.

(10) Patent No.: US 10,966,893 B2
(45) Date of Patent: Apr. 6, 2021

(54) EXOSKELETON APPARATUS FOR LIMB REHABILITATION

(71) Applicant: Hiwin Technologies Corp., Taichung (TW)

(72) Inventors: Shih-En Liu, Taichung (TW); Fu-Han Hsieh, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 403 days.

(21) Appl. No.: 15/933,502

(22) Filed: Mar. 23, 2018

(65) Prior Publication Data
US 2019/0290527 A1 Sep. 26, 2019

(51) Int. Cl.
| | | |
|---|---|---|
| *A61H 1/02* | (2006.01) | |
| *B25J 9/00* | (2006.01) | |
| *B25J 11/00* | (2006.01) | |

(52) U.S. Cl.
CPC .......... *A61H 1/0274* (2013.01); *B25J 9/0006* (2013.01); *B25J 11/008* (2013.01);
(Continued)

(58) Field of Classification Search
CPC . B25J 9/0006; B25J 11/008; B25J 9/06; B25J 9/126; B25J 9/042; B25J 18/00;
(Continued)

(56) References Cited

U.S. PATENT DOCUMENTS

| | | | | |
|---|---|---|---|---|
| 5,085,556 A | * | 2/1992 | Ohtomi | B25J 9/023 |
| | | | | 414/744.3 |
| 5,811,951 A | * | 9/1998 | Young | B25J 9/042 |
| | | | | 318/568.1 |

(Continued)

FOREIGN PATENT DOCUMENTS

| | | |
|---|---|---|
| CN | 104523401 A | 4/2015 |
| CN | 106924013 A | 7/2017 |

(Continued)

OTHER PUBLICATIONS

Yu et al. "Development of a upper-limb exoskeleton robot for refractory construction," Dec. 16, 2017, Control Engineering Practice 72, 104-113 (Year: 2017).*

(Continued)

*Primary Examiner* — Justine R Yu
*Assistant Examiner* — Christopher E Miller
(74) *Attorney, Agent, or Firm* — Birch, Stewart, Kolasch & Birch, LLP (57) ABSTRACT

An exoskeleton apparatus includes a base unit, a support unit, and upper and lower arm units. The support unit is rotatable about a vertical first axis relative to the base unit. The upper arm unit includes a linking axle, a main arm that has a connecting end rotatable about a horizontal second axis, and a linkage mechanism for rotating the linking axle relative to the main arm about a horizontal third axis. The lower arm unit is rotatable relative to the upper arm unit, and includes a lower arm set co-rotatably coupled to the linking axle, a hand-receiving seat rotatably connected to the lower arm set, and a lower arm receiving seat connected to the hand-receiving seat, and a drive member for rotating the hand-receiving seat about a horizontal fourth axis.

9 Claims, 13 Drawing Sheets

(52) U.S. Cl.
CPC ............... *A61H 2201/1215* (2013.01); *A61H 2201/149* (2013.01); *A61H 2201/1638* (2013.01); *A61H 2201/1673* (2013.01); *A61H 2203/0431* (2013.01)

(58) Field of Classification Search
CPC .......... B25J 18/04; A61H 1/02; A61H 1/0274; A61H 1/0277; A61H 1/0281; A61H 1/0285; A61H 2201/1215; A61H 2201/1635; A61H 2201/1673; A61H 2205/06; A61H 1/0237; A61H 1/024
See application file for complete search history.

(56) References Cited

U.S. PATENT DOCUMENTS

| | | | | |
|---|---|---|---|---|
| 6,301,526 | B1* | 10/2001 | Kim | B25J 9/0006 600/1 |
| 9,375,598 | B1* | 6/2016 | Lai | A61H 1/0274 |
| 10,736,809 | B2* | 8/2020 | Cempini | A61H 1/0281 |
| 2003/0028130 | A1* | 2/2003 | Wunderly | A63B 21/00181 601/5 |
| 2003/0115954 | A1* | 6/2003 | Zemlyakov | A63B 21/4019 73/379.01 |
| 2008/0009771 | A1* | 1/2008 | Perry | B25J 9/0006 600/587 |
| 2009/0148263 | A1* | 6/2009 | Lee | B25J 9/1045 414/735 |
| 2009/0149783 | A1* | 6/2009 | Nef | A63B 23/03508 601/5 |
| 2009/0281465 | A1* | 11/2009 | Fu | A61H 1/0274 601/5 |
| 2010/0016766 | A1* | 1/2010 | Zhang | A61H 1/0281 601/5 |
| 2011/0251533 | A1* | 10/2011 | Han | A61H 1/0274 601/33 |
| 2012/0172769 | A1* | 7/2012 | Garrec | A61F 5/013 601/33 |
| 2012/0179075 | A1 | 7/2012 | Perry et al. | |
| 2012/0328395 | A1* | 12/2012 | Jacobsen | B25J 3/04 414/1 |
| 2012/0330198 | A1* | 12/2012 | Patoglu | B25J 9/0003 601/33 |
| 2013/0060171 | A1* | 3/2013 | Fu | A61H 1/02 601/5 |
| 2013/0237883 | A1* | 9/2013 | Malosio | A61H 1/0274 601/33 |
| 2014/0137686 | A1* | 5/2014 | Nogami | B25J 18/00 74/490.03 |
| 2014/0336542 | A1* | 11/2014 | Fu | A61H 1/0277 601/5 |
| 2015/0360069 | A1* | 12/2015 | Marti | A63B 23/03508 482/6 |
| 2016/0000633 | A1* | 1/2016 | An | A61H 1/0277 601/33 |
| 2016/0339583 | A1* | 11/2016 | Van Engelhoven | B25H 1/10 |
| 2017/0100295 | A1* | 4/2017 | Bonutti | A61F 5/013 |
| 2017/0173783 | A1* | 6/2017 | Angold | B25J 9/109 |
| 2017/0189257 | A1* | 7/2017 | Lan | A63B 21/4017 |
| 2017/0340502 | A1* | 11/2017 | Roh | A61H 1/008 |
| 2018/0071163 | A1* | 3/2018 | Cempini | A61H 1/0281 |
| 2018/0289577 | A1* | 10/2018 | Danieli | A61H 1/0255 |
| 2019/0054615 | A1* | 2/2019 | Ulliman | B24D 7/02 |
| 2019/0269571 | A1* | 9/2019 | Park | A61H 1/0274 |
| 2020/0000671 | A1* | 1/2020 | Xiong | A61H 1/0281 |
| 2020/0155406 | A1* | 5/2020 | Baldoni | A61H 1/0281 |

FOREIGN PATENT DOCUMENTS

| | | |
|---|---|---|
| JP | H0373133 U | 7/1991 |
| JP | 2016533248 A | 10/2016 |
| TW | D187691 S | 1/2018 |
| WO | WO 2008/155286 A1 | 12/2008 |

OTHER PUBLICATIONS

Chinese Search Report for Chinese Application No. 201711320250.3, dated Dec. 1, 2020, with English translation.

* cited by examiner

EXOSKELETON APPARATUS FOR LIMB REHABILITATION

FIELD

The disclosure relates to an exoskeleton apparatus, and more particularly to an exoskeleton apparatus for limb rehabilitation.

BACKGROUND

A conventional exoskeleton apparatus for limb rehabilitation, as disclosed in U.S. Pat. No. 9,017,271 B2, includes a wall, a horizontally-extending beam mounted to the wall, a first motor disposed at an end of the beam, a horizontal rod driven by the first motor to rotate about a vertical first axis relative to the beam, a vertically-extending hinged element pivotally connected to an end of the horizontal rod, a second motor disposed at a bottom portion of the hinged element, a support member driven by the second motor to rotate relative to the hinged element about a horizontal second axis which is perpendicular to the first axis, a slide member disposed to be movable in a lengthwise direction of the support member, a C-shaped frame connected to the slide member, a third motor for driving rotation of the C-shaped frame, a lower arm positioning member pivotally connected to the C-shaped frame, and a fourth motor for driving rotation of the lower arm positioning member. The conventional exoskeleton apparatus is capable of providing a six-degree-of-freedom exoskeleton mechanism for rehabilitation purpose. However, since the beam, the horizontal rod, and the hinged element are disposed above the scapula, the humerous, and the shoulder joint of a user, the above-mentioned components of the conventional exoskeleton apparatus may undesirably obstruct arm movement of the user during rehabilitation. Moreover, the positions of the components of the conventional exoskeleton apparatus have to be precisely adjusted to suit users of different body sizes.

Another conventional exoskeleton apparatus, as disclosed in WO2013186705A2, is portable and can be worn by a user as a backpack. This conventional exoskeleton apparatus includes a multi-linkage mechanism that mimics shoulder joint, that is driven by a motor, and that provides a four-degree-of-freedom exoskeleton mechanism for rehabilitation purpose. However, the arm length of such conventional exoskeleton apparatus is fixed and cannot be adjusted for users of different body sizes, and the multi-linkage mechanism has a relatively complex structure and cannot be adjusted for both left arm use and right arm use.

Yet another conventional exoskeleton apparatus, as disclosed in WO2015048688 A1, includes amounting seat, a horizontal rod connected to the mounting seat, a first motor for driving rotation of the horizontal rod relative to the mounting seat, a vertical rod connected to the horizontal rod, a second motor for driving up-and-down swinging movement of the vertical rod relative to the horizontal rod, an inner linking rod connected to the vertical rod, and an outer linking rod pivotally connected to the inner linking rod. Even though such conventional exoskeleton apparatus can provide a three-degree-of-freedom exoskeleton mechanism, the conventional exoskeleton apparatus is relatively bulky in size since the distance between the center of rotation of the apparatus and the center of rotation of the shoulder joint of a user is relatively large. Moreover, the outer linking rod is provided with a handgrip that provides a two-degree-of-freedom mechanism at an end thereof, thus the exact position of the hand and arm of the user cannot be determined.

SUMMARY

Therefore, an object of the disclosure is to provide an exoskeleton apparatus that can alleviate at least one of the drawbacks of the prior arts.

According to the disclosure, the exoskeleton apparatus for limb rehabilitation includes a base unit, a support unit, an upper arm unit, and a lower arm unit.

The base unit includes a base, and a first drive member disposed on the base.

The support unit is driven by the first drive member to rotate about a vertical first axis relative to the base, and includes a support that is pivotally connected to the base, and a positioning seat that is connected to the support, that is disposed above the base, and that is provided with a second drive member and a third drive member.

The upper arm unit includes a linking axle, a main arm, and a linkage mechanism. The main arm has a connecting end rotatably connected to the positioning seat and driven by the second drive member to rotate about a horizontal second axis which is perpendicular to the first axis, and a linking end opposite to the connecting end and connected to the linking axle. The linkage mechanism is disposed on a side of the main arm, is connected between the positioning seat and the linking end of the main arm, and is driven by the third drive member to rotate the linking axle relative to the linking end of the main arm about a horizontal third axis that is parallel to the second axis.

The lower arm unit is driven by the linkage mechanism to rotate relative to the upper arm unit, and includes a lower arm set that is fixedly and co-rotatably coupled to the linking axle, a hand-receiving seat that is rotatably connected to the lower arm set and that is adapted for receiving a hand, and a lower arm receiving seat that is connected to the hand-receiving seat, that is disposed on a side of the lower arm set, and that is adapted for receiving a lower arm. The lower arm set is provided with a fourth drive member for rotating the hand-receiving seat about a horizontal fourth axis which is perpendicular to the first and second axes.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
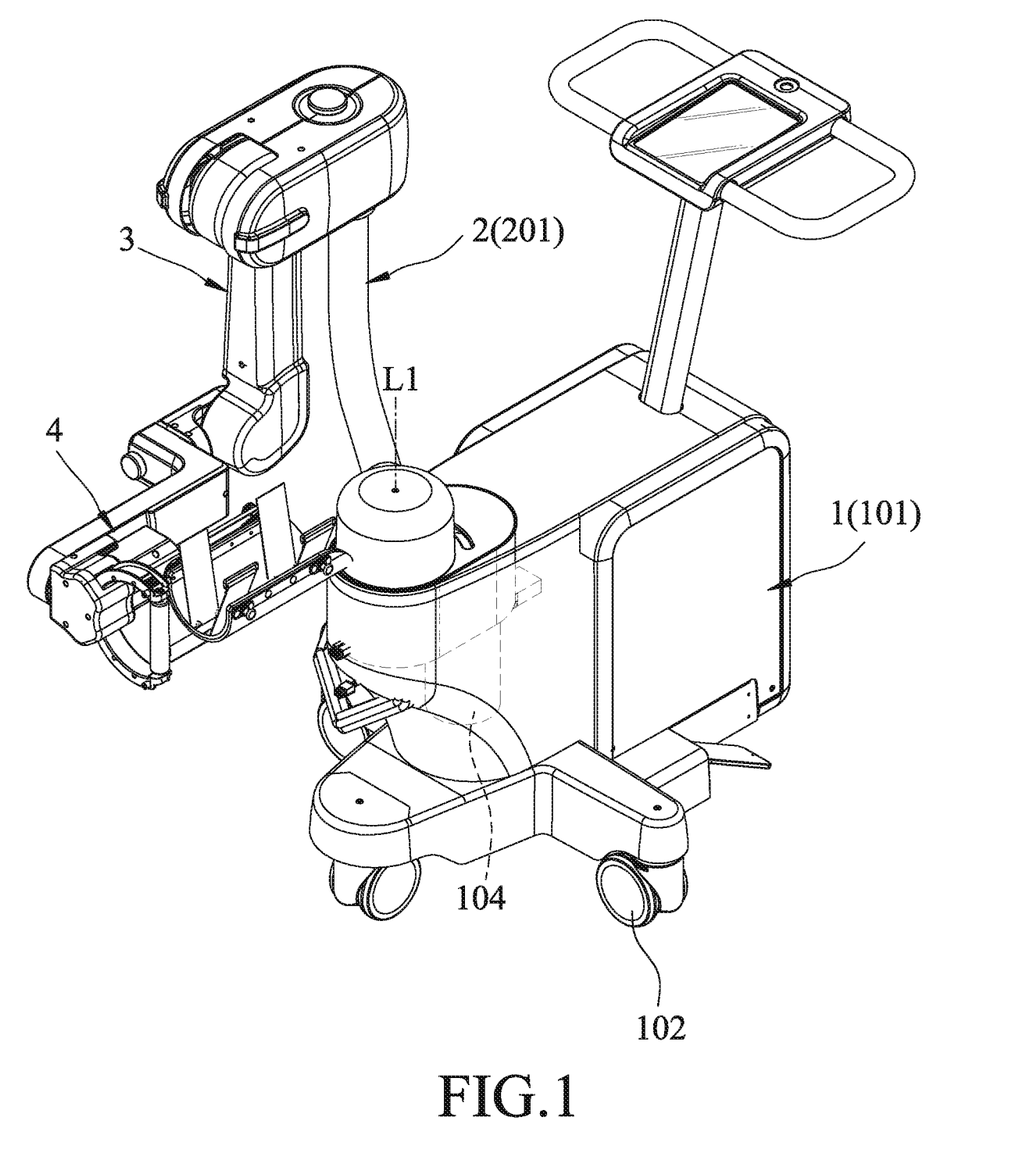
FIG. 1 is a perspective view illustrating an embodiment of an exoskeleton apparatus according to the disclosure.
Figure 2:
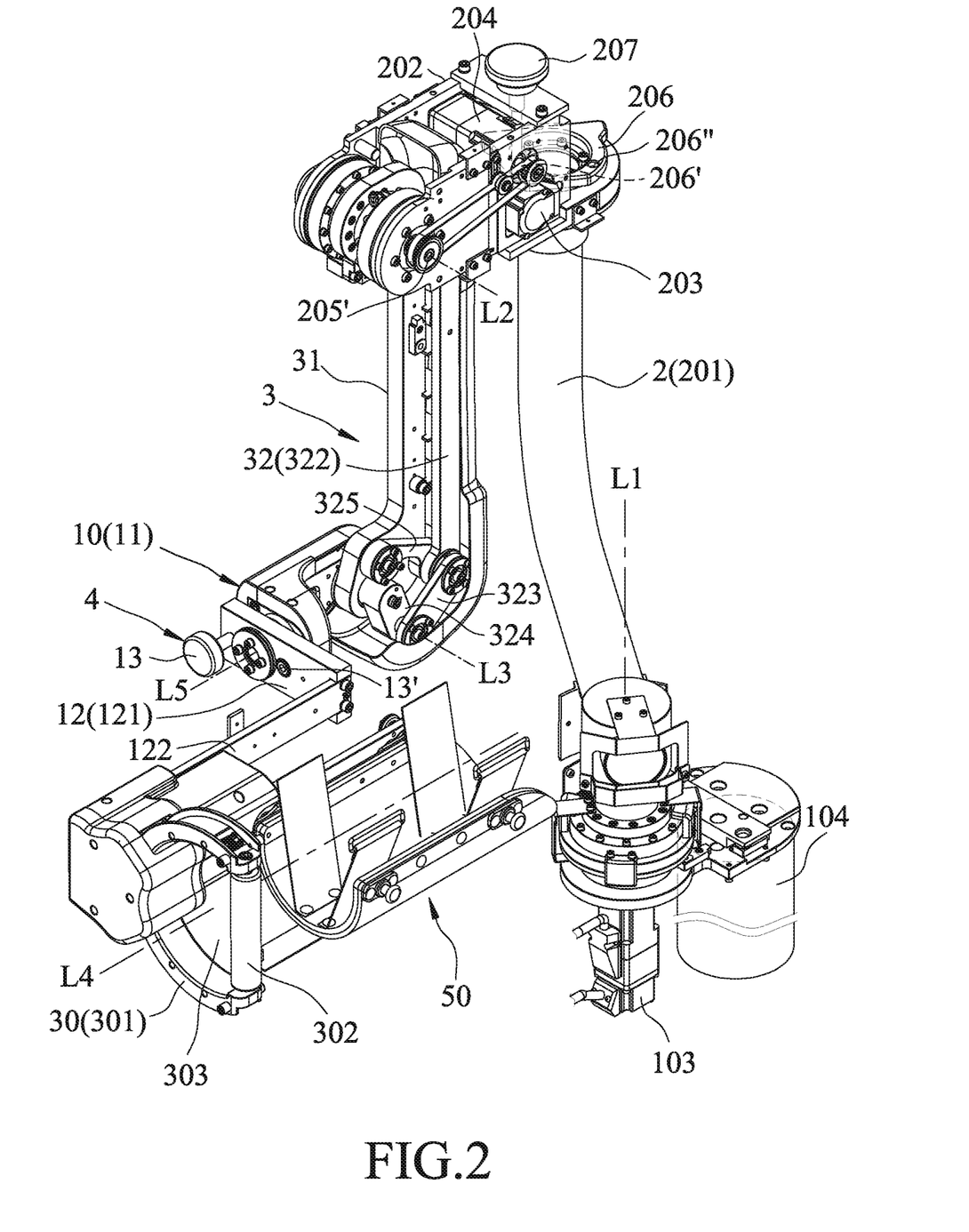
FIG. 2 is a fragmentary perspective view of the embodiment, illustrating a support unit, an upper arm unit, and a lower arm unit.

Referring to FIGS. 1 and 2, an embodiment of an exoskeleton apparatus for limb rehabilitation includes a base unit 1, a support unit 2, an upper arm unit 3, and a lower arm unit 4.

The base unit 1 includes a base 101, a plurality of wheels 102 mounted to a bottom portion of the base 101, a first drive member 103 disposed on the base 101, and an elevating member 104 that is operable for lifting and lowering the first drive member 103, the support unit 2, and the upper and lower arm units 3, 4 relative to the base 101. In this embodiment, the first drive member 103 is a servo motor, and the elevating member 104 is a hydraulic cylinder (e.g., oil cylinder).

The support unit 2 is driven by the first drive member 103 to rotate about a vertical first axis (L1) relative to the base 101, and includes a support 201 and a positioning seat 202 connected to a top portion of the support 201, and disposed above and at a side of the base 101.

The support 201 is curved and extends generally upward from the base 101, is pivotally connected to the base 101, and includes a positioning plate 206 and a securing member 207. The positioning plate 206 is disposed on a side of the positioning seat 202, and has a first engaging hole 206' and a second engaging hole 206" that are spaced apart from each other. The securing member 207 removably extends into the positioning seat 202, and is engageable in a selected one of the first and second engaging holes 206', 206" so as to position the positioning seat 202 relative to the support 201.

The positioning seat 202 is provided with a second drive member 203, a third drive member 204 disposed at a side of the second drive member 203, and first and second drive axles 205, 205'. In this embodiment, the second and third drive members 203, 204 are servo motors that drive rotations of the first and second drive axles 205, 205', respectively.

Figure 3:
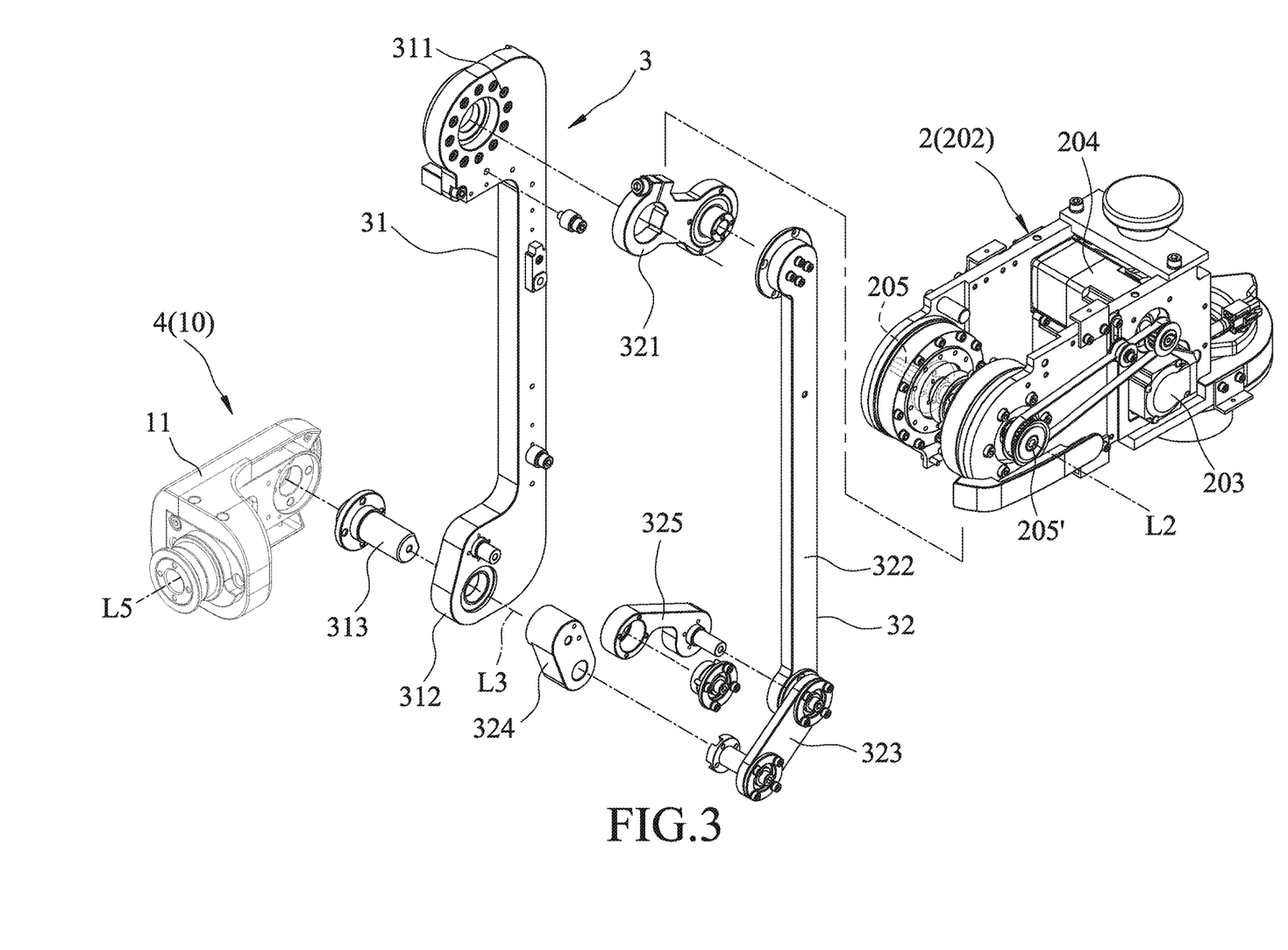
FIG. 3 is a fragmentary partly exploded perspective view of the embodiment, illustrating a positioning seat of the support unit, the upper arm unit, and a portion of the lower arm unit.
Figure 5:
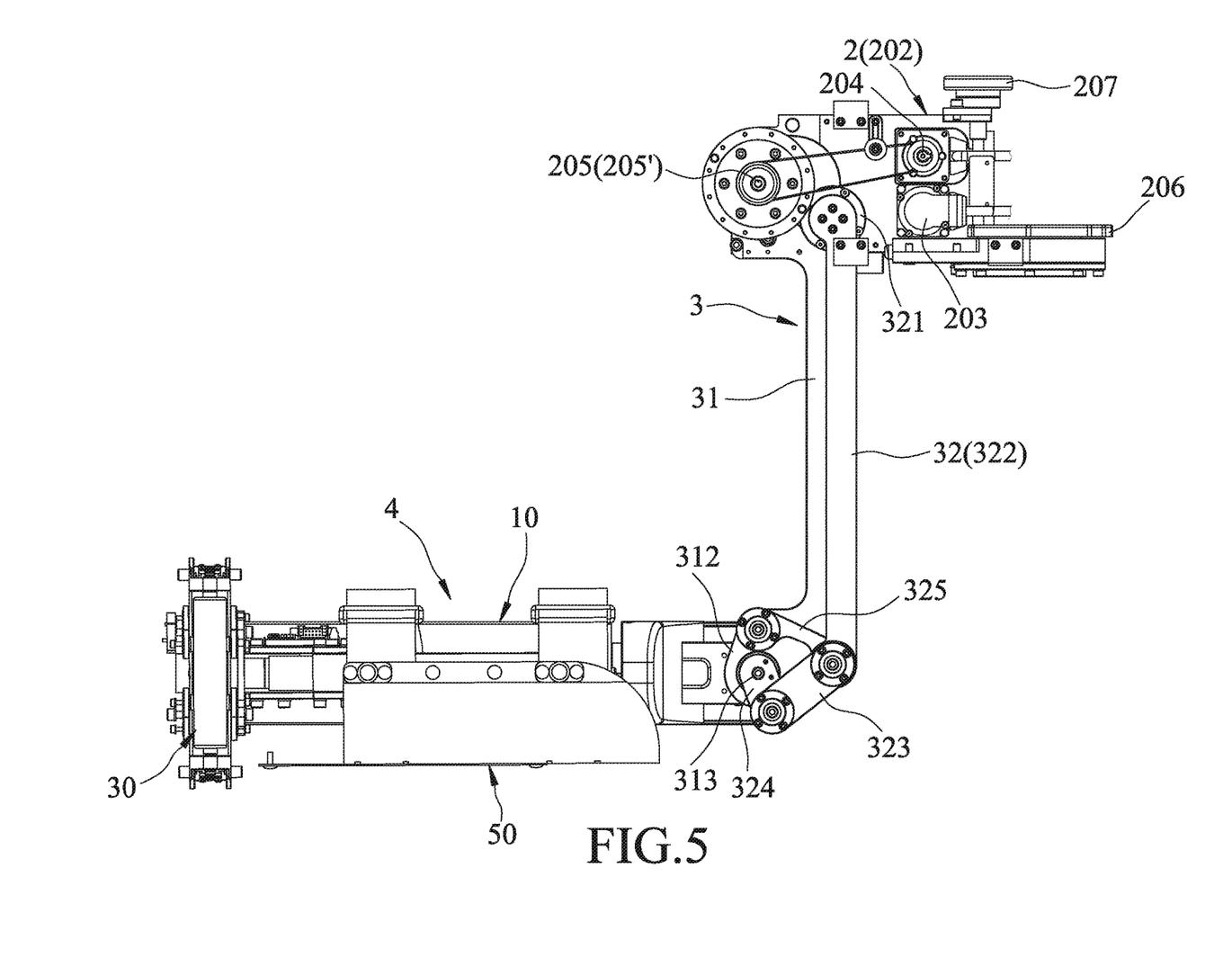
FIG. 5 is a fragmentary schematic side view of the embodiment.

With further reference to FIGS. 3 and 5, the upper arm unit 3 includes a linking axle 313, a main arm 31, and a linkage mechanism 32. The main arm 31 has a connecting end 311 and a linking end 312. The connecting end 311 is rotatably connected to the positioning seat 202, is co-rotatably coupled to the first drive axle 205, and is driven by the second drive member 203 to rotate about a horizontal second axis (L2) which is perpendicular to the first axis (L1). The linking end 312 is opposite to the connecting end 311 and is connected to the linking axle 313.

The linkage mechanism 32 is disposed on a side of the main arm 31, is connected between the second drive axle 205' of the positioning seat 202 and the linking end 312 of the main arm 31, and is driven by the third drive member 204 to rotate the linking axle 313 relative to the linking end 312 of the main arm 31 about a horizontal third axis (L3) that is parallel to the second axis (L2).

The linkage mechanism 32 includes a connecting plate 321 connected to the second drive axle 205' of the positioning seat 202 and driven by the third drive member 204 to rotate about the second axis (L2), a first link 322 having one end that is pivotally connected to the connecting plate 321, a second link 323 having one end that is pivotally connected to the other end of the first link 322, a third link 324 having one end that is pivotally connected to the other end of the second link 323 and that is disposed between the second link 323 and the linking end 312 of the main arm 31, and the other end that is fixedly and co-rotatably coupled to the linking axle 313, and a fourth link 325 having one end that is pivotally connected to the first link 322 and the second link 323, and the other end that is pivotally connected to the linking end 312 of the main arm 31. The linking axle 313 extends along the third axis (L3).

Figure 4:
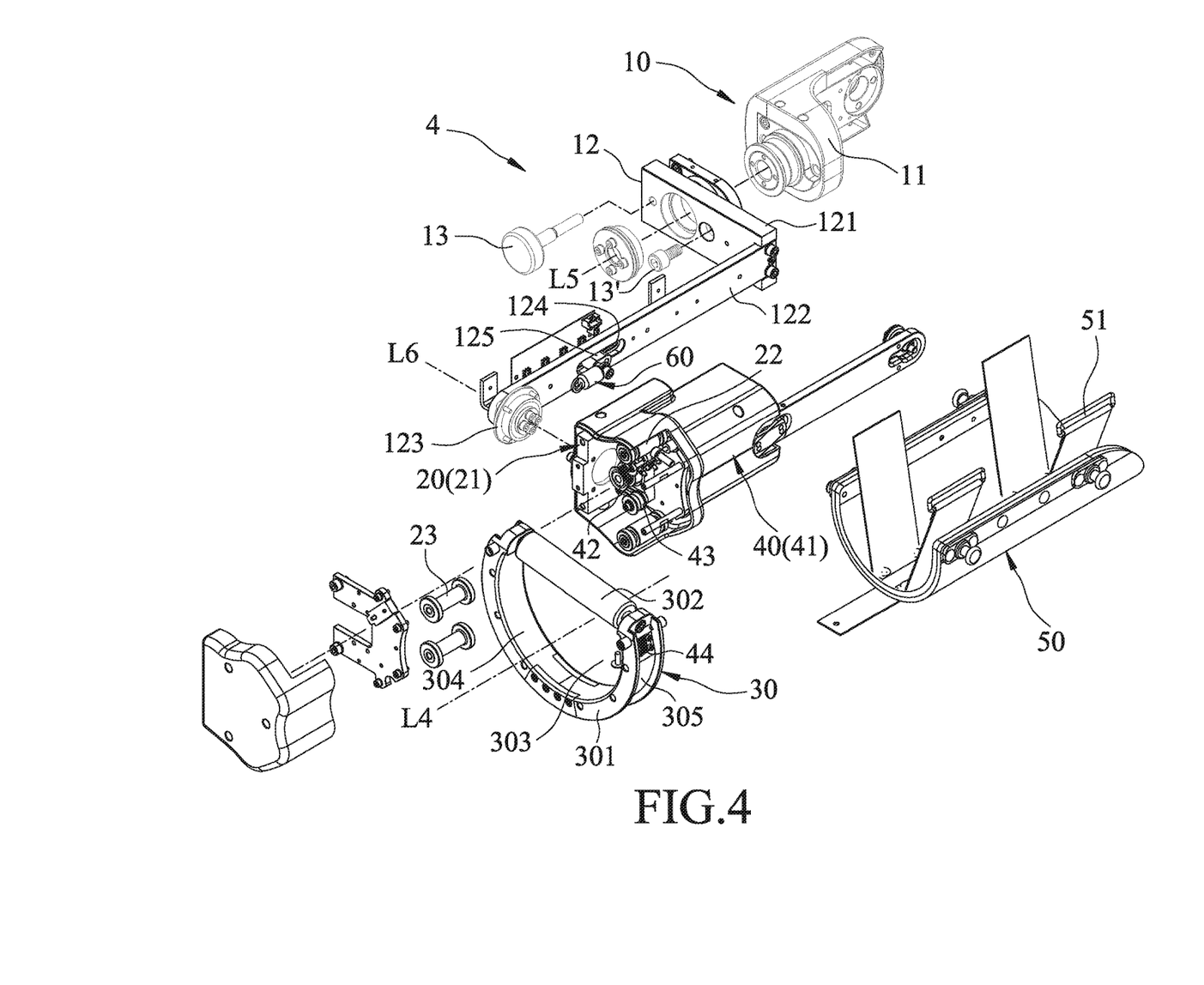
FIG. 4 is a partly exploded perspective view of the lower arm unit.
Figure 6:
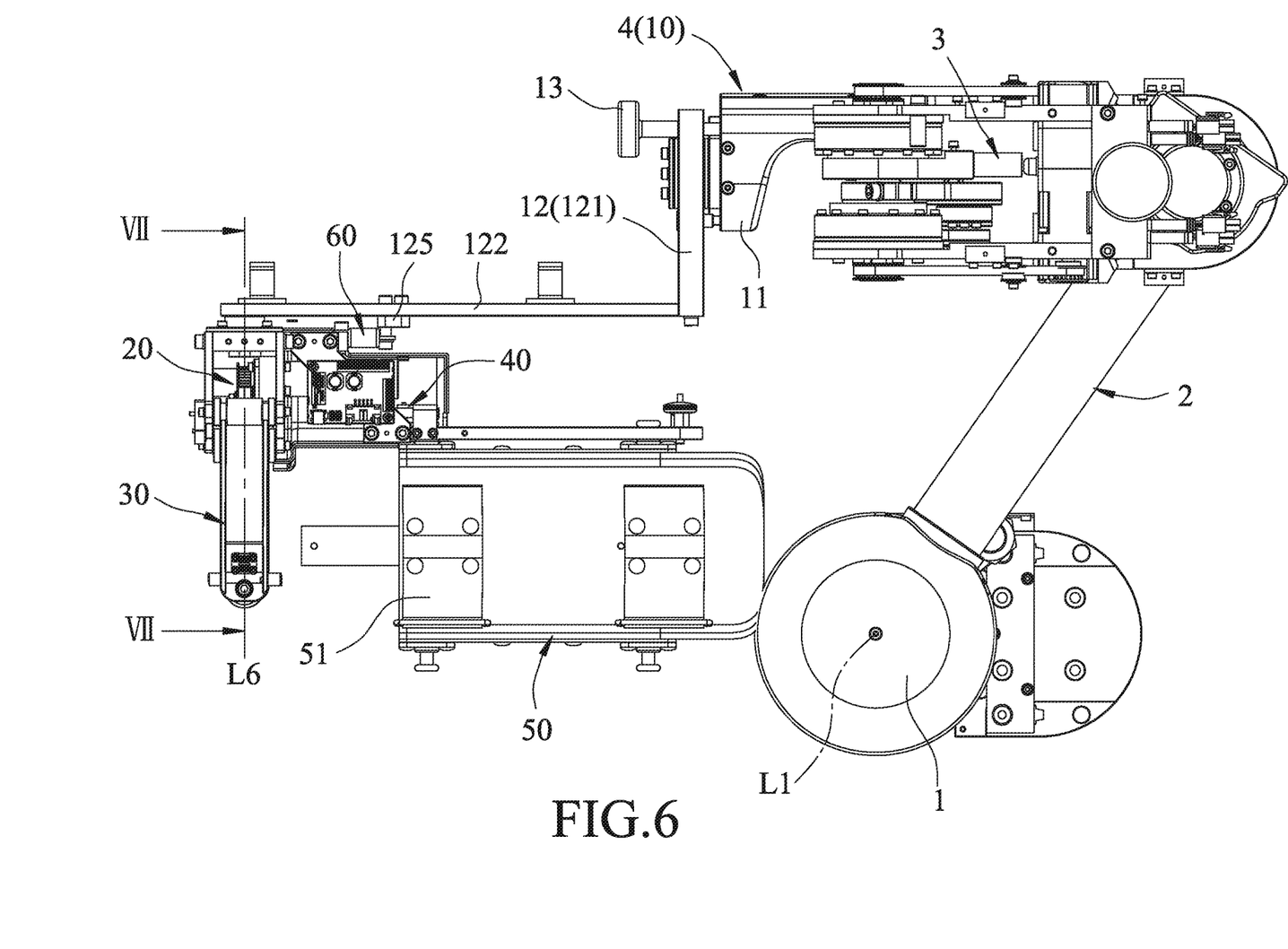
FIG. 6 is a schematic top view of the embodiment.

Referring to FIGS. 3, 4, and 6, the lower arm unit 4 is driven by the linkage mechanism 32 to rotate relative to the upper arm unit 3, and includes a lower arm set 10, a coupling seat 20, a hand-receiving seat 30, a lower arm receiving seat 50, a lower arm receiving seat 50, and a resilient member 60.

The lower arm set 10 is fixedly and co-rotatably coupled to the linking axle 313. The lower arm set 10 is provided with a fourth drive member 40 disposed in the coupling seat 20 for rotating the hand-receiving seat 30 about a horizontal fourth axis (L4) which is perpendicular to the first and second axes (L1, L2). The lower arm set 10 includes a main part 11 fixedly coupled to the linking axle 313, a front part 12 connected to the main part 11 and rotatable relative to the main part 11 about a horizontal fifth axis (L5) which is parallel to the fourth axis (L4), and two lock pieces 13, 13' for fixing angular position of the front part 12 with respect to the main part 11. In this embodiment, the front part 12 of the lower arm set 10 is rotatable by 180 degrees relative to the main part 11, one of the lock pieces 13, 13' is a stud, and the other one of the lock pieces 13, 13' is a screw. Alternatively, the lower arm set 10 may include only one of the lock pieces 13, 13'.

The front part 12 of the lower arm set 10 includes a first plate 121 that extends along a direction parallel to the third axis (L3), a second plate 122 that extends along a direction parallel to the fifth axis (L5) and that is connected to an end of the first plate 121 at one end thereof, and a connector 123 that is disposed on the other end of the second plate 122. The second plate 122 of the lower arm set 10 has a slide slot 124 extending in a longitudinal direction thereof, and a slider 125 movable in the slot 124.

Figure 7:
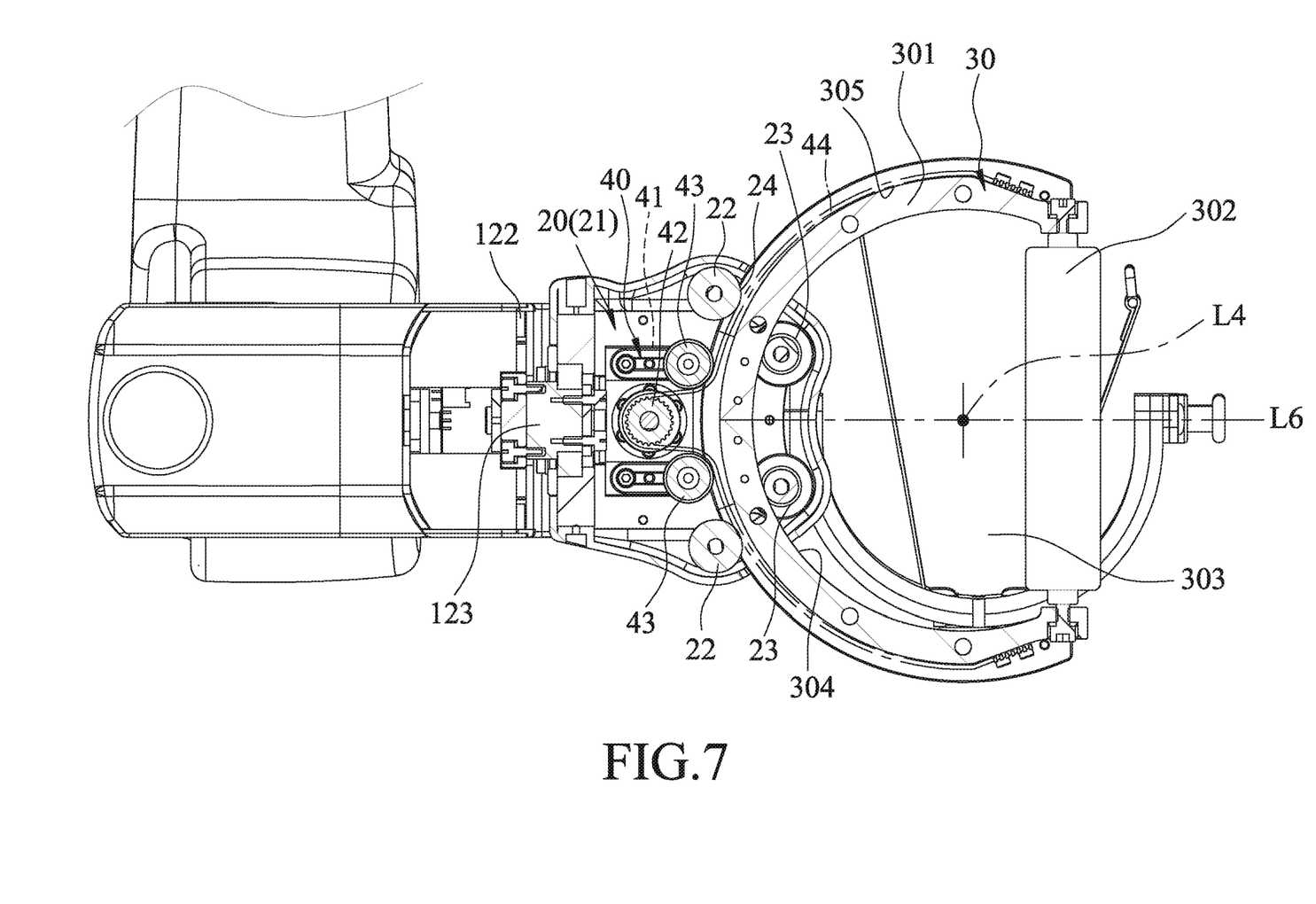
FIG. 7 is a sectional view taken along line VII-VII of FIG. 6, illustrating the lower arm unit.

With further reference to FIG. 7, the coupling seat 20 is connected between the second plate 122 and the hand-receiving seat 30 and rotatable relative to the connector 123 about a horizontal sixth axis (L6) which is parallel to the third axis (L3). The coupling seat 20 has a seat body 21, a plurality of outer rollers 22 rotatably mounted on the seat body 21, a plurality of inner rollers 23 rotatably mounted on the seat body 21 and spaced apart from and respectively corresponding in position to the outer rollers 22 such that the inner and outer rollers 22 cooperate to constitute an arc-shaped rail 24.

The hand-receiving seat 30 is rotatably connected to the lower arm set 10 and is adapted for receiving a hand, and includes an arc-shaped frame 301 slidably disposed on the arc-shaped rail 24 such that the arc-shaped frame 301 is disposed around the inner rollers 23 and is surrounded by the outer rollers 22, and a handgrip 302 connected to the arc-shaped frame 301 and adapted for a hand to hold thereon. The arc-shaped frame 301 is driven by the fourth drive member 40 to rotate about the fourth axis (L4), and has an inner surface 304 that defines an insert space 303 adapted for insertion of a hand therein, and an outer surface 305 that is opposite to the inner surface 304 and that is convex. In this embodiment, the handgrip 302 is rod-shaped, and has two ends that are respectively connected to opposite ends of the arc-shaped frame 301. As shown in FIGS. 6 and 7, the handgrip 302 of the hand-receiving seat 30 has a center of rotation that lies on the sixth axis (L6).

The fourth drive member 40 has a motor 41 mounted to the coupling seat 20, a pulley 42 driven by the motor 41 to rotate, two idlers 43 disposed on a side of the outer rollers 22, and a timing belt 44 fastened to the arc-shaped frame 301 and trained around the pulley 42 and the idlers 43 so as to allow for rotation of the hand-receiving seat 30 about the fourth axis (L4).

The lower arm receiving seat 50 is connected to the hand-receiving seat 30 and the coupling seat 20, is disposed on a side of the lower arm set 10 to correspond in position to the insert space 303 of the arc-shaped frame 301, and is adapted for receiving a lower arm. The lower arm receiving seat 50 has a plurality of spaced-apart fastening members 51 that are adapted to be fastened to position an arm of a user in place.

The resilient member 60 has one end connected to the slider 125 of the second plate 122 and the other end connected to the connector 123, and is connected to the coupling seat 20 such that the resilient member 60 generates a damping force during rotation of the coupling seat 20 relative to the second plate 122, and provides a restoring force for returning the coupling seat 20 to an original angular position after rotation. The resilient member 60 may be configured as a tension spring or may be made of polyurethane.

Figure 11:
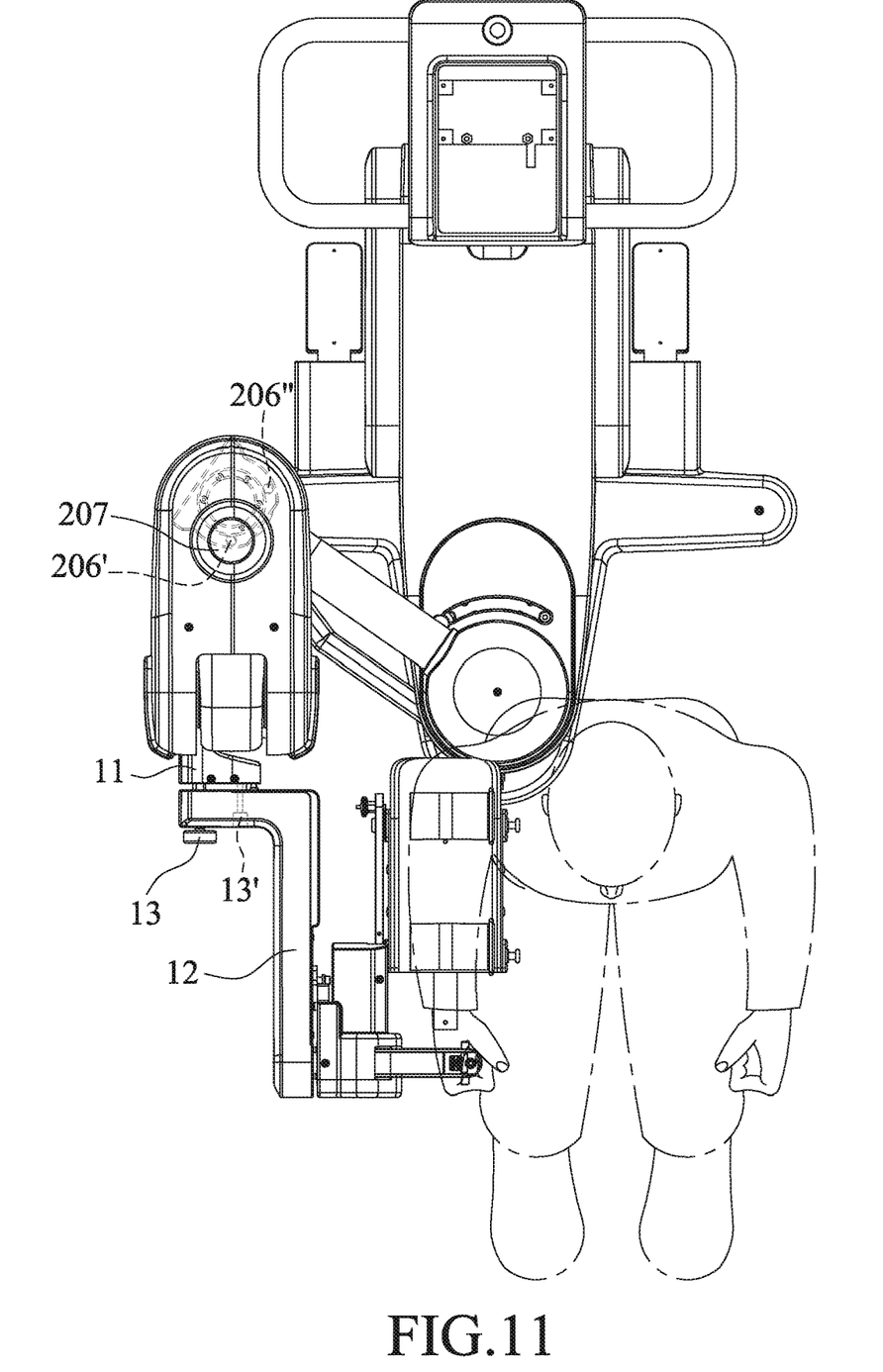
FIG. 11 is a schematic view illustrating operation of the embodiment for right arm use.

Referring to FIGS. 1 and 11, after a user/patient sitting on a wheelchair or a seat is well positioned, a physiatrist can adjust the position of the exoskeleton apparatus, turn on the power of the exoskeleton apparatus, and then input the physiological parameters of the patient for resetting the exoskeleton apparatus to suit the need of the patient. Afterwards, the exoskeleton apparatus can be brought near, for example, a right arm of the patient, and the height of the positioning seat 202 can be adjusted to correspond in position to the shoulder joint of the patient by using the elevating member 104. At this time, the patient can have his/her lower arm placed on the lower arm receiving seat 50 with the fastening members 51 fastened, and have his/her hand holding the handgrip 302.

The physiatrist at this point can move the arm of the patient for rehabilitation purpose with a control unit (not shown) of the exoskeleton apparatus recording the movement therealong. Since the configuration of the control unit is not of the essence of the present disclosure, further details of the same will not be provided herein for the sake of brevity. The components of the exoskeleton apparatus can carry out the exact movement recorded by the control unit after a button (not shown) for starting the training program is pressed by the physiatrist. The movement is repeated for a preset period of time, and afterwards the components of the exoskeleton apparatus will return to an original position. At this time, the training is completed and the fastening members 51 can be unfastened to free the arm of the patient.

The detail operation of the exoskeleton apparatus is described in the following. FIGS. 1, 2, and 5 illustrate that the components of the exoskeleton apparatus are at their original position, where the upper arm unit 3 is substantially vertical and parallel to the first axis (L1), and the lower arm unit 4 is substantially horizontal and perpendicular to the upper arm unit 3.

When the rehabilitation training begins, the exoskeleton apparatus can be operated to move in the following ways:

The first drive member 103 controls rotation of the upper arm unit 3 outward or inward toward the patient's body, as shown in FIGS. 1 and 6. Specifically, the first drive member 103 drives rotation of the support unit 2, the upper arm unit 3, and the lower arm unit 4 as an integral unit to rotate about the vertical first axis (L1).

The second drive member 203 controls the upper arm unit 3 to move frontward and upward, or to move rearward and downward, as shown in FIGS. 5 to 9. When the second drive member 203 drives the first drive axle 205 to rotate, the linking end 312 of the main arm 31 is driven to rotate about the horizontal second axis (L2). In this way, the patient can swing his/her upper arm frontward and backward with the shoulder joint of the patient as a pivot point.

The third drive member 204 controls the lower arm unit 4 to move upward or downward. When the third drive member 204 drives the second drive axle 205' to rotate, the connecting plate 321 of the linkage mechanism 32 is driven to rotate about the second axis (L2), so as to drive movements of the first, second, third, and fourth links 322, 323, 324, 325 relative to the linking end 312 of the main arm 31. In the mean time, the third link 324 drives rotation of the linking axle 313 about the third axis (L3), so that the lower arm unit 4 is rotated relative to the upper arm unit 3, and the patient can swing his/her lower arm upward and downward with the elbow of the patient as a pivot point.

The fourth drive member 40 controls rotational movement of the lower arm unit 4. As shown in FIG. 7, when the fourth drive member 40 is actuated, the motor 41 drives rotation of the pulley 42 to move the timing belt 44, such that the hand-receiving seat 30 is driven by the timing belt 44 to rotate about the fourth axis (L4), thereby rotating the lower arm of the patient relative to the upper arm.

In addition, as shown in FIGS. 6 and 7, the coupling seat 20, the hand-receiving seat 30, and the lower arm receiving seat 50 are formed as an integral unit that can rotate about the sixth axis (L6) relative to the lower arm set 10 for swinging movement of the wrist of the patient. By virtue of the configuration of the resilient member 60 and the design of the handgrip 302 of the hand-receiving seat 30 having a center of rotation that lies on the sixth axis (L6), the lower arm unit 4 is ergonomically designed to suit the wrist of a patient.

Figure 12:
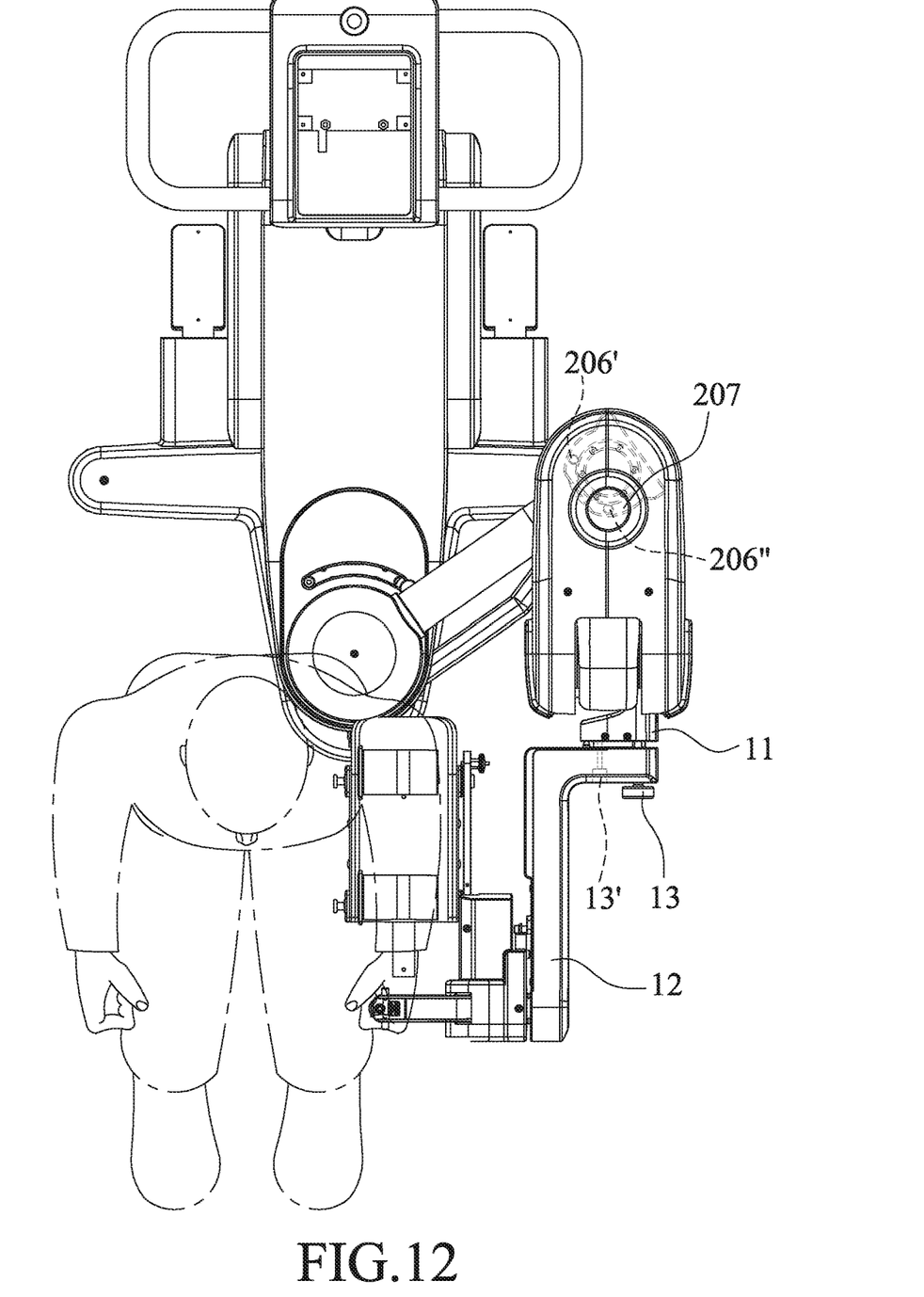
FIG. 12 is another schematic view illustrating operation of the embodiment for left arm use.

As shown in FIG. 11, the securing member 207 is inserted in the first engaging hole 206' so that the positioning seat 202 is at a position suitable for rehabilitation of a right arm of a patient. When the securing member 207 is removed from the first engaging hole 206' and the positioning seat 202 is rotated relative to the support 201 to a position that the securing member 207 can be inserted in the second engaging hole 206", the positioning seat 202 is at a position suitable for rehabilitation of a left arm of a patient, as shown in FIG. 12. When switching between right arm use and left arm use, the lock pieces 13, 13' can be operated for positioning the front part 12 of the lower arm set 10 in place with respect to the main part 11 after rotation of the front part 12 relative to the main part 11.

Figure 13:
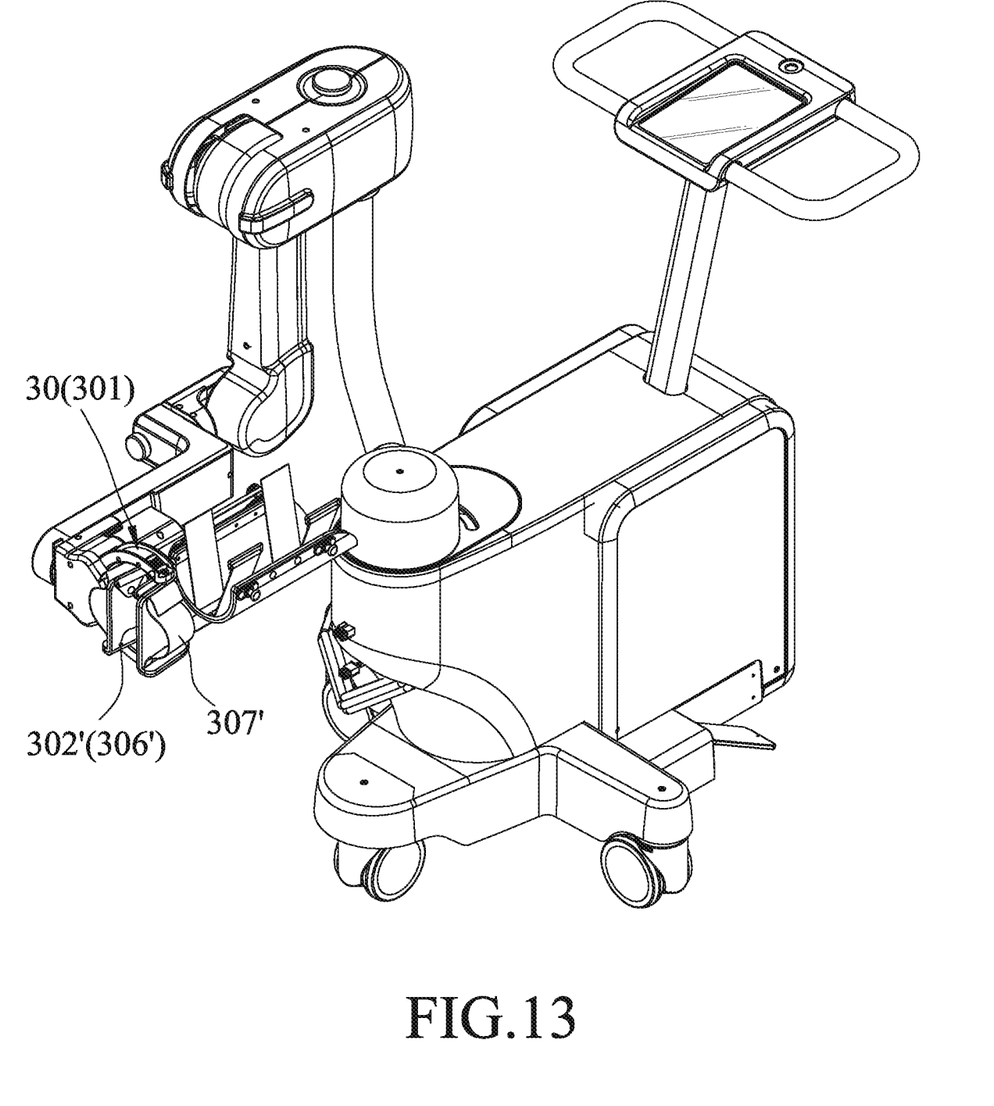
FIG. 13 is a perspective view illustrating a modification of a handgrip of the lower arm unit.

It should be noted that the handgrip 302 of the hand-receiving seat 30 can be modified to suit different rehabilitation needs. As shown in FIG. 13, a modified handgrip 302' has a palm-receiving portion 306' that has a U-shaped cross section and that is adapted for receiving a palm of the patient, and two straps 307' that are adapted for fastening the palm of the patient in place.

In summary, the exoskeleton apparatus of the disclosure has the following advantages:

1. By virtue of the cooperation among the base unit 1, the support unit 2, and the upper and lower arm units 3, 4, the exoskeleton apparatus provides three-dimension movement for rehabilitation purpose.

Figure 8:
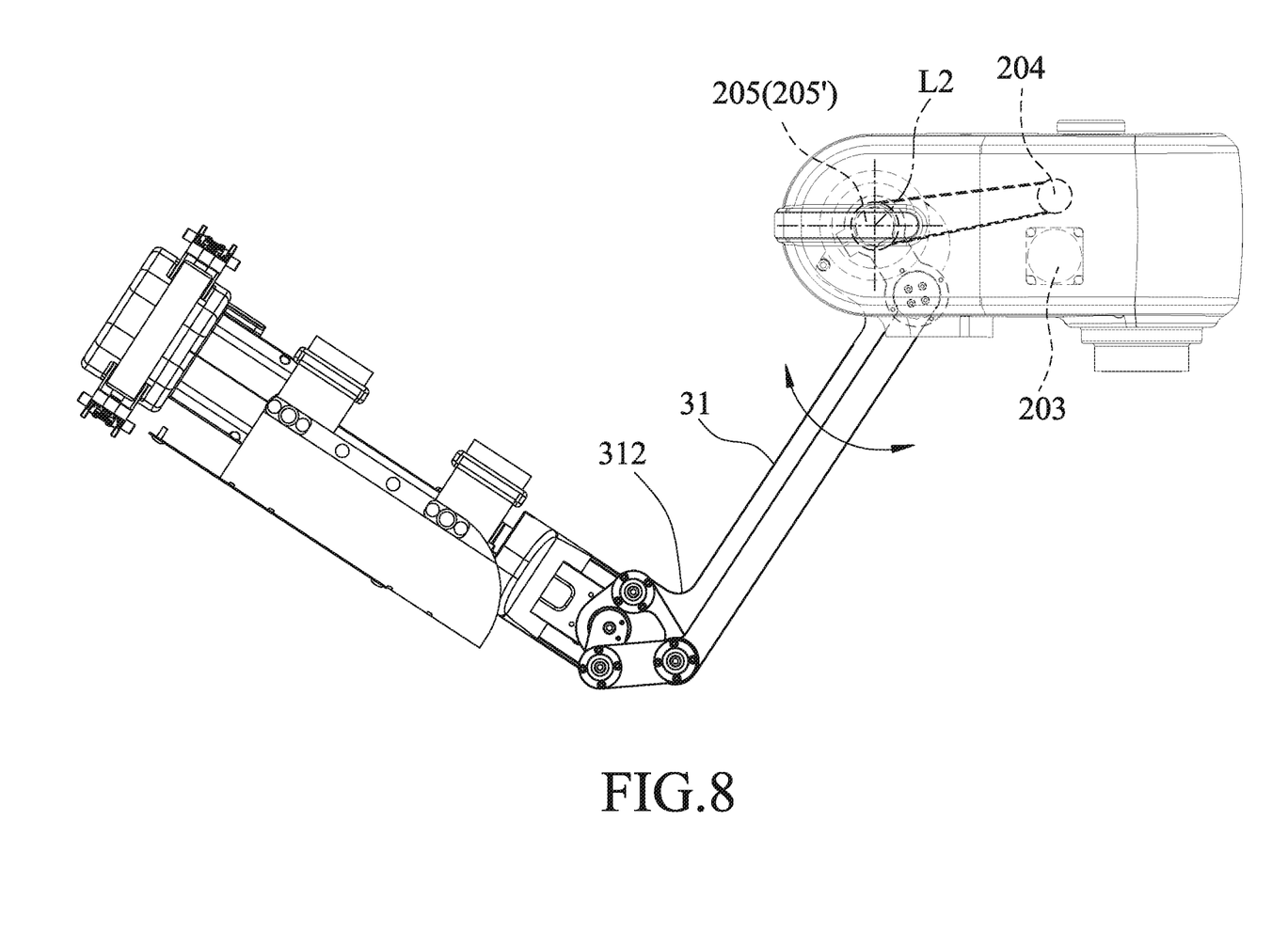
FIG. 8 is a schematic view illustrating operation of the embodiment.
Figure 9:
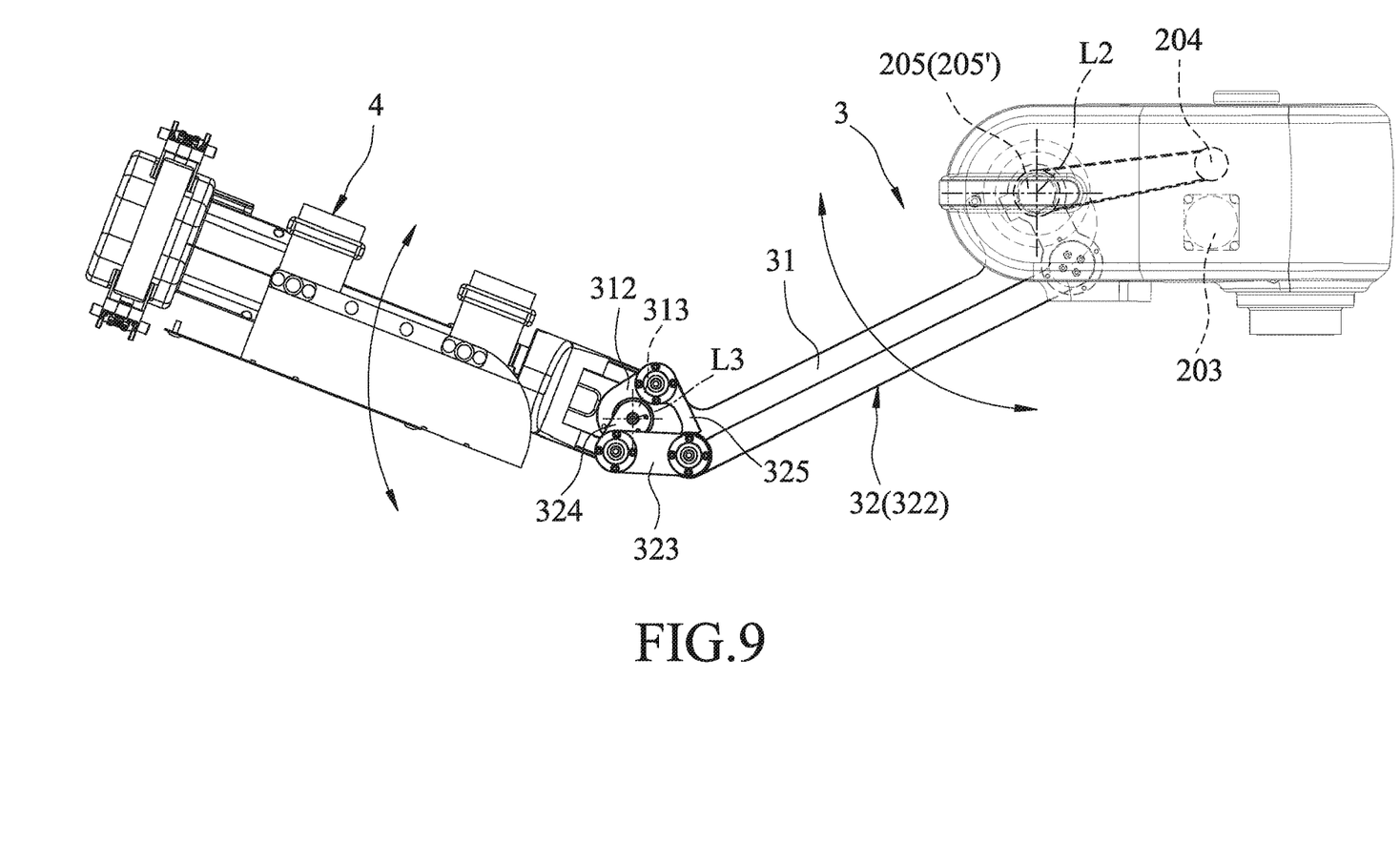
FIG. 9 is another schematic view illustrating operation of the embodiment.
Figure 10:
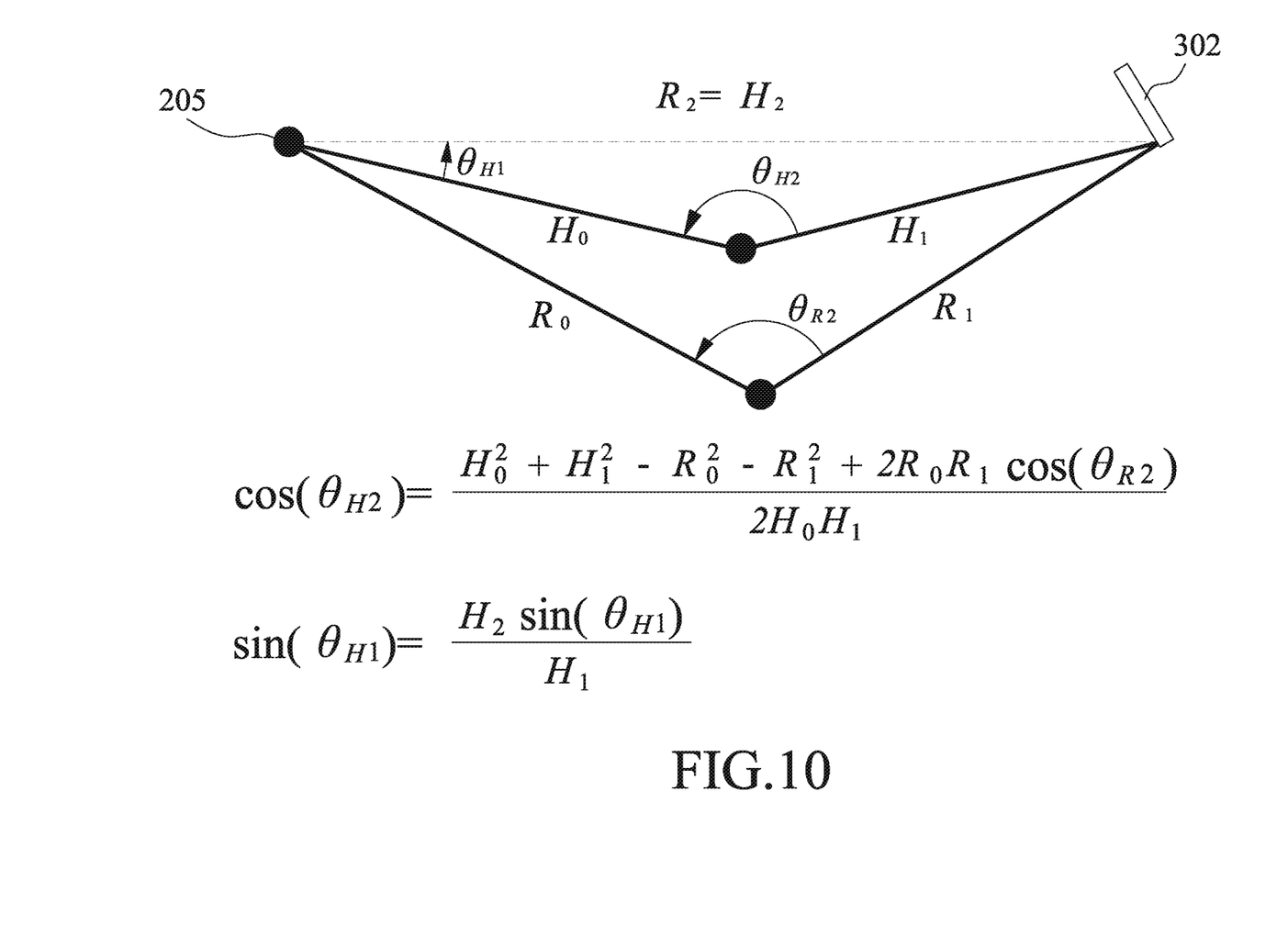
FIG. 10 is a schematic diagram illustrating the angles formed between upper and lower arms of different users and their mathematical relationship.

2. In the equations in FIG. 10, $H_0$ denotes the length of the upper arm of a user H, $H_1$ denotes the length of the lower arm of the user H, $R_0$ denotes the length of the upper arm of a user R, and $R_1$ denotes the length of the lower arm of the user R. Under the condition that the distance between the first drive axle 205 and the handgrip 302 is fixed ($R_2=H_2$), when the physiological parameters of the patients are inputted, the control unit of the exoskeleton apparatus calculates and determines the angle ($\theta_{H2}$, $\theta_{R2}$) between the upper and lower arms of each of the users H, R, and the angle between the upper and lower arm units 3, 4 can be adjusted accordingly to suit the users H, R of different body sizes (i.e., different arm lengths), as shown in FIGS. 8 and 9.

3. The components of the exoskeleton apparatus will not obstruct arm movement of the patient during rehabilitation, thereby enhancing smoothness in training.

4. The exoskeleton apparatus is suitable for both left arm use and for right arm use, and switching between left and right arms is relatively easy to operate.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An exoskeleton apparatus for limb rehabilitation comprising:
    a base unit including a base, and a first actuator disposed on said base;
    a support unit driven by said first actuator to rotate about a vertical first axis relative to said base, and including a support that is pivotally connected to said base, and a positioning seat that is connected to said support, that is disposed above said base, and that is provided with a second actuator and a third actuator;
    an upper arm unit including
        a linking axle,
        a main arm that has a connecting end rotatably connected to said positioning seat and driven by said second actuator to rotate about a horizontal second axis which is perpendicular to the first axis, and a linking end opposite to said connecting end and connected to said linking axle, and
        a linkage mechanism that is disposed on a side of said main arm, that is connected between said positioning seat and said linking end of said main arm, and that is driven by said third actuator to rotate said linking axle relative to said linking end of said main arm about a horizontal third axis that is parallel to the second axis; and
    a lower arm unit driven by said linkage mechanism to rotate relative to said upper arm unit, and including a lower arm set that is fixedly and co-rotatably coupled to said linking axle, a hand-receiving seat that is rotatably connected to said lower arm set and that is adapted for receiving a hand, and a lower arm receiving seat that is connected to said hand-receiving seat, that is disposed on a side of said lower arm set, and that is adapted for receiving a lower arm,
    said lower arm set being provided with a fourth actuator for rotating said hand-receiving seat about a horizontal fourth axis which is perpendicular to the first and second axes;
    wherein said base unit includes an elevating member that is operable for lifting and lowering said first actuator, said support unit, and said upper and lower arm units relative to said base; and
    wherein said linkage mechanism includes a connecting plate connected to said positioning seat and rotatable about the second axis, a first link having one end that is pivotally connected to said connecting plate, a second link having one end that is pivotally connected to the other end of said first link, a third link having one end that is pivotally connected to the other end of said second link and that is disposed between said second link and said linking end of said main arm, and the other end that is co-rotatably coupled to said linking axle, and a fourth link having one end that is pivotally connected to said first link and said second link, and the other end that is pivotally connected to said linking end of said main arm, said linking axle extending along the third axis.

2. The exoskeleton apparatus as claimed in claim 1, wherein said lower arm set of said lower arm unit includes a main part fixedly coupled to said linking axle, a front part connected to said main part and rotatable relative to said main part about a horizontal fifth axis which is parallel to the fourth axis, and at least one lock piece for fixing angular position of said front part with respect to said main part.

3. The exoskeleton apparatus as claimed in claim 2, wherein said front part of said lower arm set is rotatable by 180 degrees relative to said main part.

4. The exoskeleton apparatus as claimed in claim 2, wherein:
    said front part of said lower arm set includes a first plate that extends along a direction parallel to the third axis, a second plate that extends along a direction parallel to the fifth axis and that is connected to an end of said first plate at one end thereof, and a connector that is disposed on the other end of said second plate; and
    said lower arm unit further includes
        a coupling seat connected between said second plate and said hand-receiving seat and rotatable relative to said connector about a horizontal six axis which is parallel to the third axis, and
        a resilient member connected between said second plate and said connector, generating a damping force during rotation of said coupling seat relative to said second plate, and providing a restoring force for returning said coupling seat to an original angular position after rotation.

5. The exoskeleton apparatus as claimed in claim 4, wherein said second plate of said lower arm set has a slide slot extending in a longitudinal direction thereof, and a slider connected to an end of said resilient member and movable in said slot.

6. The exoskeleton apparatus as claimed in claim 4, wherein:
    said coupling seat of said lower arm unit has a seat body, a plurality of outer rollers rotatably mounted on said seat body, a plurality of inner rollers rotatably mounted on said seat body and spaced apart from and respectively corresponding in position to said outer rollers such that said inner and outer rollers cooperate to constitute an arc-shaped rail;
    said hand-receiving seat includes an arc-shaped frame slidably disposed on said arc-shaped rail such that the arc-shaped frame is disposed around said inner rollers and is surrounded by said outer rollers, and a handgrip connected to said arc-shaped frame and adapted for a hand to hold thereon; and
    said arc-shaped frame is driven by said fourth actuator to rotate about the fourth axis.

7. The exoskeleton apparatus as claimed in claim 6, wherein said fourth actuator has a motor mounted to said coupling seat, a pulley driven by said motor to rotate, two idlers disposed on a side of said outer rollers, and a timing belt fastened to said arc-shaped frame and trained around said pulley and said idlers so as to allow for rotation of said hand-receiving seat about the fourth axis.

8. The exoskeleton apparatus as claimed in claim 6, wherein said hand-receiving seat has a center of rotation that lies on the sixth axis.

9. The exoskeleton apparatus as claimed in claim 1, wherein said support of said support unit includes
    a positioning plate disposed on a side of said positioning seat, and having a first engaging hole and a second engaging hole that are spaced apart from each other, and
    a securing member removably extending into said positioning seat, and being engageable in a selected one of said first and second engaging holes so as to position said positioning seat relative to said support.

\* \* \* \* \*